US011269126B2

(12) United States Patent
Kurihara

(10) Patent No.: US 11,269,126 B2
(45) Date of Patent: Mar. 8, 2022

(54) LIGHT GUIDE, LIGHT GUIDE UNIT, MANUFACTURING METHOD OF LIGHT GUIDE UNIT, AND ELECTRONIC DEVICE

(71) Applicant: NEC Display Solutions, Ltd., Tokyo (JP)

(72) Inventor: Satoshi Kurihara, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/647,438

(22) PCT Filed: Nov. 9, 2017

(86) PCT No.: PCT/JP2017/040353
§ 371 (c)(1),
(2) Date: Mar. 13, 2020

(87) PCT Pub. No.: WO2019/092824
PCT Pub. Date: May 16, 2019

(65) Prior Publication Data
US 2020/0271846 A1 Aug. 27, 2020

(51) Int. Cl.
*F21V 8/00* (2006.01)
(52) U.S. Cl.
CPC .................. *G02B 6/0016* (2013.01)
(58) Field of Classification Search
CPC .... G02B 6/0016; G02B 6/424; G02B 6/4298; G02B 6/102
See application file for complete search history.

(56) References Cited

U.S. PATENT DOCUMENTS

| 2005/0094940 | A1* | 5/2005 | Gao | G02B 6/4298 385/39 |
| 2007/0263411 | A1* | 11/2007 | Schellhorn | G02B 6/0043 362/615 |
| 2010/0209062 | A1* | 8/2010 | Sasada | G02B 6/4471 385/135 |
| 2011/0194034 | A1* | 8/2011 | Shimizu | G02B 6/0073 348/739 |
| 2012/0127141 | A1 | 5/2012 | Choi et al. | |
| 2016/0085015 | A1* | 3/2016 | Kim | G02B 6/0091 362/621 |

FOREIGN PATENT DOCUMENTS

| JP | S57-198803 U | 12/1982 |
| JP | H10-93255 A | 4/1998 |

(Continued)

OTHER PUBLICATIONS

International Search Report (ISR) (PCT Form PCT/ISA/210), in PCT/JP2017/040353, dated Dec. 12, 2017.

*Primary Examiner* — Kevin Quarterman
(74) *Attorney, Agent, or Firm* — McGinn I.P. Law Group, PLLC.

(57) ABSTRACT

A light guide includes: a light guide main body that guides light input from an incident surface to an exit surface; and an attachment member that is connected to the light guide main body and includes an attachment portion that is to be fixed to another member, and the area of a connection surface between the attachment member and the light guide main body is smaller than the cross-sectional area of the attachment portion.

18 Claims, 6 Drawing Sheets

(56) References Cited

FOREIGN PATENT DOCUMENTS

| | | | |
|---|---|---|---|
| JP | H10-170847 | A | 6/1998 |
| JP | 2000-243985 | A | 9/2000 |
| JP | 2004-274407 | A | 9/2004 |
| JP | 2014-180936 | A | 9/2014 |
| JP | 2014180936 | A * | 9/2014 |
| JP | 2015-060094 | A | 3/2015 |

* cited by examiner

Related Art

LIGHT GUIDE, LIGHT GUIDE UNIT, MANUFACTURING METHOD OF LIGHT GUIDE UNIT, AND ELECTRONIC DEVICE

TECHNICAL FIELD

The present invention relates to a light guide that guides light, such as infrared light, a light guide unit in which the light guide is installed in a holding member, a manufacturing method of the light guide unit, and an electronic device that installs the light guide or the light guide unit and that can be remotely controlled using light, such as infrared light.

BACKGROUND ART

Conventionally, a light guide that guides incident light to an optical receiving unit is used as an optical receiving apparatus that is used for remotely controlling an electronic device, such as an image display apparatus. For example, in an infrared light guide member disclosed in Patent Document 1, the light guide member is fixed to the front face of a front panel of an electronic device using an attachment plate, and infrared light that has been input through an incident surface is guided to an optical receiver through an exit surface.

However, there is a problem in that fixing the light guide member using the attachment plate, which is a separate member, results in a complicated assembly operation and high costs. Moreover, although there are means for holding a light guide member using a holding member, means for fixing a light guide member using an adhesive, and so forth, there is a problem in that manufacturing costs are increased even in these cases.

Moreover, for example, a light guide 100 as shown in FIG. 10 (a) is proposed as another light guide. The light guide 100 is integrally formed so that the shape of the light guide 100 becomes approximately a cross, a light guide main body 101 is formed in the longitudinal direction of the light guide 100, and attachment portions 102 to another member are formed on the both side faces of the light guide main body 101. The shape of the light guide main body 101 is, for example, a rectangular plate, and the attachment portions 102 are, for example, plate-shaped members of which thickness is smaller than that of the light guide main body 101.

In the light guide 100, as shown in FIGS. 10 (b) and (c), an incident surface 101a for infrared rays is formed on one end portion in the longitudinal direction of the light guide main body 101, and an optical receiving unit 103 can optically receive the infrared rays emitted through an exit surface 101b, which is provided on the other end portion. Because the light guide 100 does not require an attachment plate, which is a separate member, the parts costs and the assembly costs can be reduced.

PRIOR ART DOCUMENT

Patent Document

Patent Document 1: Japanese Unexamined Patent Application, First Publication No. 2000-243985

SUMMARY OF THE INVENTION

Problems to be Solved by Invention

However, when the incident light is totally reflected by the side faces, the front surface, and the back surface within the light guide main body 101 of the light guide 100 and is guided to the exit surface 101b, part of the incident light is not totally reflected by connection portions between the light guide main body 101 and the attachment portions 102, the part of the incident light enters the attachment portions 102 to deviate from an optical path, and the part of the incident light is emitted to the outside, and thus the part of the incident light cannot arrive at the optical receiving unit 103. For this reason, there is a drawback in that the quantity of the part of the infrared light, which enters the attachment portions 102 from the light guide main body 101, is lost.

The present invention has been made in view of the above-described problem, and an example object of the present invention is to provide a light guide, a light guide unit, a manufacturing method of the light guide unit, and an electronic device that are capable of reducing loss of the quantity of the incident light that enters the attachment portions from the light guide main body and more effectively guiding the incident light.

Means for Solving the Problems

A light guide in accordance with the present invention includes: a light guide main body that guides light input from an incident surface to an exit surface; and an attachment member that is connected to the light guide main body and includes an attachment portion that is to be fixed to another member, wherein the area of a connection surface between the attachment member and the light guide main body is smaller than the cross-sectional area of the attachment portion.

A light guide unit in accordance with the present invention includes: the above-described light guide; a holding member in which a recessed groove to which the light guide is fitted is formed; a protrusion that is formed in one of the attachment portion and the recessed groove; and a hole portion that is formed in the other of the attachment portion and the recessed groove, the protrusion being inserted into the hole portion, wherein the protrusion is coupled to the hole portion.

An electronic device in accordance with the present invention includes: a main body of the electronic device; and the above-described light guide that is installed in the main body of the electronic device, wherein the incident surface of the light guide main body is exposed to outside from the main body of the electronic device.

A manufacturing method of a light guide unit in accordance with the present invention includes: a step of fitting the above-described light guide to a recessed groove that is formed in a holding member and inserting a protrusion that is formed in one of the attachment portion of the light guide and the recessed groove into a hole portion that is formed in the other of the attachment portion of the light guide and the recessed groove; and a step of fixing the protrusion and the hole portion using thermal welding.

Example Advantages of the Invention

With the light guide, the light guide unit, and the electronic device in accordance with the present invention, even if the part of the light that has entered the light guide main body deviates to the attachment member to thereby result in loss of the quantity of the light, the lost quantity of the light can be reduced because the area of the connection surface between the attachment member and the light guide main body is smaller than the cross-sectional area of the attachment portion, and the attachment portion can be fixed with high strength because the cross-sectional area of the attachment portion is relatively large.

Moreover, with the manufacturing method of the light guide unit in accordance with the present invention, the attachment portion of the light guide can be fixed to the recessed groove of the holding member by thermally welding the protrusion and the hole portion.

MODES FOR CARRYING OUT THE INVENTION

Hereinafter, light guides in accordance with respective example embodiments of the present invention will be described with reference to FIG. 1 to FIG. 9.

Figure 1:
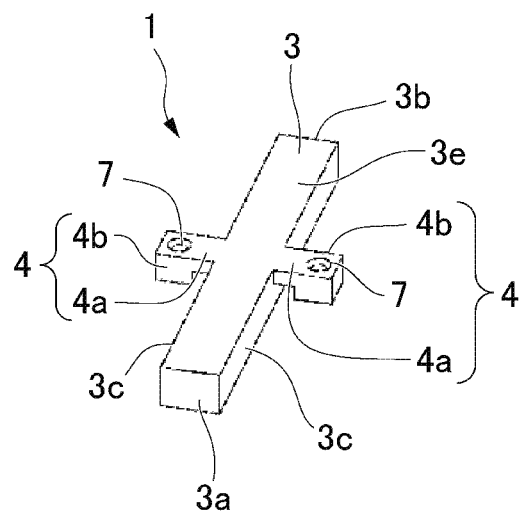
FIG. 1 is a perspective view of a light guide in accordance with a first example embodiment of the present invention.

A light guide 1 in accordance with a first example embodiment of the present invention shown in FIG. 1 is provided with a light guide main body 3 that guides light that has been input through an incident surface 3a to an exit surface 3b and attachment members 4 that are connected to the light guide main body 3 and that include attachment portions 4b that are to be fixed to an electronic device, which is another member. The thickness of each of the portions (connection surfaces 4aa) in which the attachment members 4 come into contact with the light guide main body 3 is smaller than that of the attachment portions 4b and that of the portions near the attachment portions 4b. For this reason, the area of each of the connection surfaces 4aa between the attachment members 4 and the light guide main body 3 is smaller than the cross-sectional area of each of the attachment portions 4b.

Figure 2:
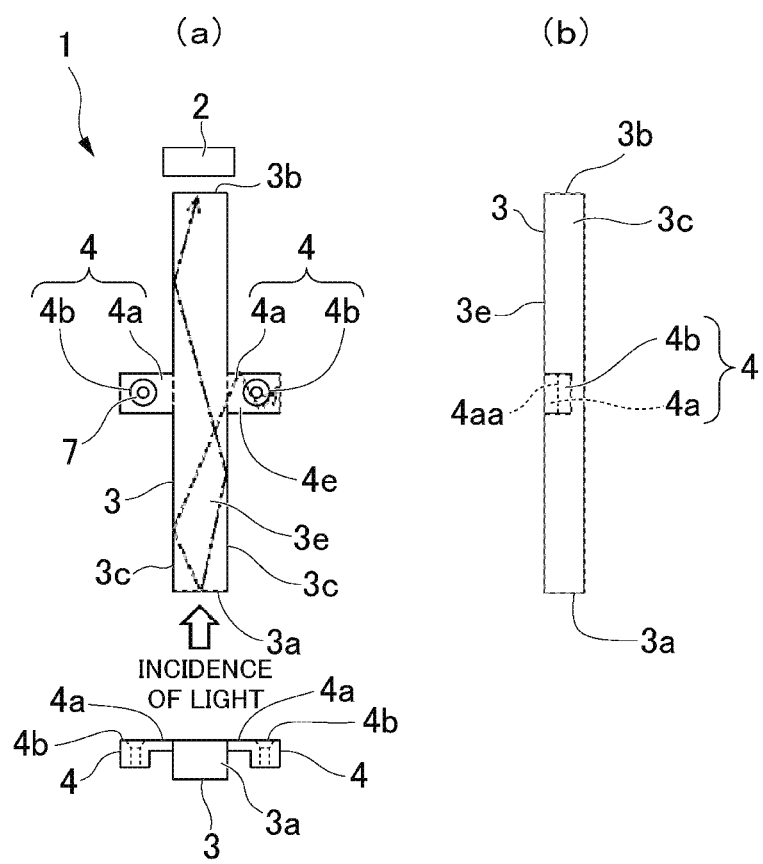
FIG. 2 shows the light guide shown in FIG. 1, (a) is a front view, and (b) is a side view.

Next, the details of the light guide 1 in accordance with the first example embodiment of the present invention will be further described on the basis of FIG. 1 and FIG. 2.

The light guide 1 is installed in, for example, an electronic device and propagates infrared light that is used for remote control while totally reflecting the infrared light, thereby guiding the infrared light to an optical receiving unit 2. The light guide 1 is integrally formed so that the shape of the light guide 1 becomes, for example, approximately a cross, and the light guide 1 is provided with the light guide main body 3, of which shape is a rectangular plate, and the attachment members 4, which protrude from both side faces 3c of the light guide main body 3. One of the end faces of the light guide main body 3 is the incident surface 3a, the infrared light enters the incident surface 3a, the other of the end faces, which is opposite to the incident surface 3a, is the exit surface 3b of the infrared light, and the exit surface 3b faces the optical receiving unit 2.

Preferably, the material of the light guide 1 is a material that has excellent transparency and high optical permeability, for example, resin such as polycarbonate. The light guide main body 3 and the attachment members 4 have the same refractive index and they are made of the same material.

A pair of the attachment members 4 is integrally formed with the both side faces 3c along the long sides of the light guide main body 3. The attachment members 4 are provided with connection portions 4a, which are coupled to the side faces 3c of the light guide main body 3, and the attachment portions 4b, which are used to fix the light guide 1 to another member, such as an electronic device. The thickness of each of the attachment portions 4b can be set as appropriate. For example, the thickness of each of the attachment portions 4b is smaller than that of each of the side faces 3c of the light guide main body 3, and hole portions 7 are formed in the attachment portions 4b along the thickness direction thereof. Pins can be fixed to the hole portions 7 by melting the pins through thermal welding while passing the pins through the hole portions 7.

The thickness of each of the connection portions 4a is smaller than that of each of the attachment portions 4b, and the connection surfaces 4aa between the connection portions 4a and the side faces 3c of the light guide main body 3 are formed so that the area of each of the connection surfaces 4aa is smaller than the cross-sectional area of each of the attachment portions 4b in the thickness direction. Preferably, the cross-sectional area of each of the connection portions 4a excluding the connection surfaces 4aa in the thickness direction is approximately the same as or greater than that of each of the connection surfaces 4aa. It is to be noted that the cross-sectional area of each of the attachment portions 4b in the thickness direction means a cross-sectional area that includes the cross-sectional area of each of the pins when the pins penetrate the hole portions 7. Moreover, it is not preferable to make the cross-sectional area of each of the attachment portions 4b in the thickness direction the same as that of each of the connection portions 4a because the strength becomes insufficient.

In the example shown in FIG. 2 (b), the area of each of the connection surfaces 4aa of the connection portions 4a is set to approximately half the cross-sectional area of each of the attachment portions 4b in the thickness direction. For this reason, the quantity of the infrared light that enters the attachment members 4 from the light guide main body 3 is reduced to approximately ½, compared to the above-described conventional art.

As will be described below, as protrusions that are to be passed through the hole portions 7, the pins are formed in another member, such as an electronic device, to which the light guide 1 is to be fixed, and the pins can be fixed to the hole portions 7 by melting the pins through thermal welding while passing the pins through the hole portions 7. Although the light guide 1 in accordance with the present example embodiment is formed so that a surface 3e of the light guide main body 3 is flush with the surfaces, including surface 4e, of the attachment members 4, the surface 3e may be formed so as to be flush with a lower surface, and the surface 3e of the light guide main body 3 may not be flush with an upper surface and the lower surface.

The light guide 1 in accordance with the present example embodiment has the above-described structure, and a remote controller radiates, for example, infrared light to enter the infrared light through the incident surface 3a of the light guide 1 that is installed in the electronic device so as to remotely operate the electronic device. The infrared light that has entered the light guide main body 3 propagates while being totally reflected by the side faces 3c, the upper surface, and the lower surface, emits from the exit surface 3b, and enters the optical receiving unit 2. As a result, a remote operation of the electronic device is performed in accordance with an instruction by the infrared light from the remote controller.

At this time, part of the infrared light enters the connection portions 4a through the connection surfaces 4aa of the attachment members 4 connected to the side faces 3c and deviates from the optical path toward the exit surface 3b. Even in this case, the quantity of infrared light that deviates from the optical path toward the exit surface 3b and enters the attachment members 4 can be reduced because the cross-sectional area of each of the connection surfaces 4aa of the connection portions 4a is smaller than that of each of the attachment portions 4b. In addition, the strength with which the light guide 1 is fixed is high because each of the attachment portions 4b is formed so that the thickness and cross-sectional area of each of the attachment portions 4b are larger than those of each of the connection portions 4a.

As described above, in the light guide 1 in accordance with the present first example embodiment, the area of each of the connection surfaces 4aa between the attachment members 4 and the light guide main body 3 is smaller than the cross-sectional area of each of the attachment portions 4b in the thickness direction, and thus the quantity of the part of the infrared light that deviates to the connection portions 4a from the optical path that goes from the incident surface 3a of the light guide main body 3 to the exit surface 3b becomes small and the lost quantity of the light can be reduced. In addition, the thickness of each of the attachment portions 4b of the attachment members 4 is larger than that of each of the connection surfaces 4aa, and thus high strength can be secured when the attachment members 4 are attached to the electronic device.

It is to be noted that the present invention is not limited to the light guide 1 in accordance with the above-described example embodiment, appropriate modification, replacement, and so forth are possible to the extent that the gist of the present invention is not changed, and such modification and replacement are included in the present invention. Next, other example embodiments and modification examples of the present invention will be described, and a description will be given using the same reference signs for the same or similar portions and members as those of the above-described example embodiment.

A light guide, a light guide unit, and an electronic device in accordance with a second example embodiment of the present invention will be described with reference to FIG. 3 to FIG. 9.

Figure 3:
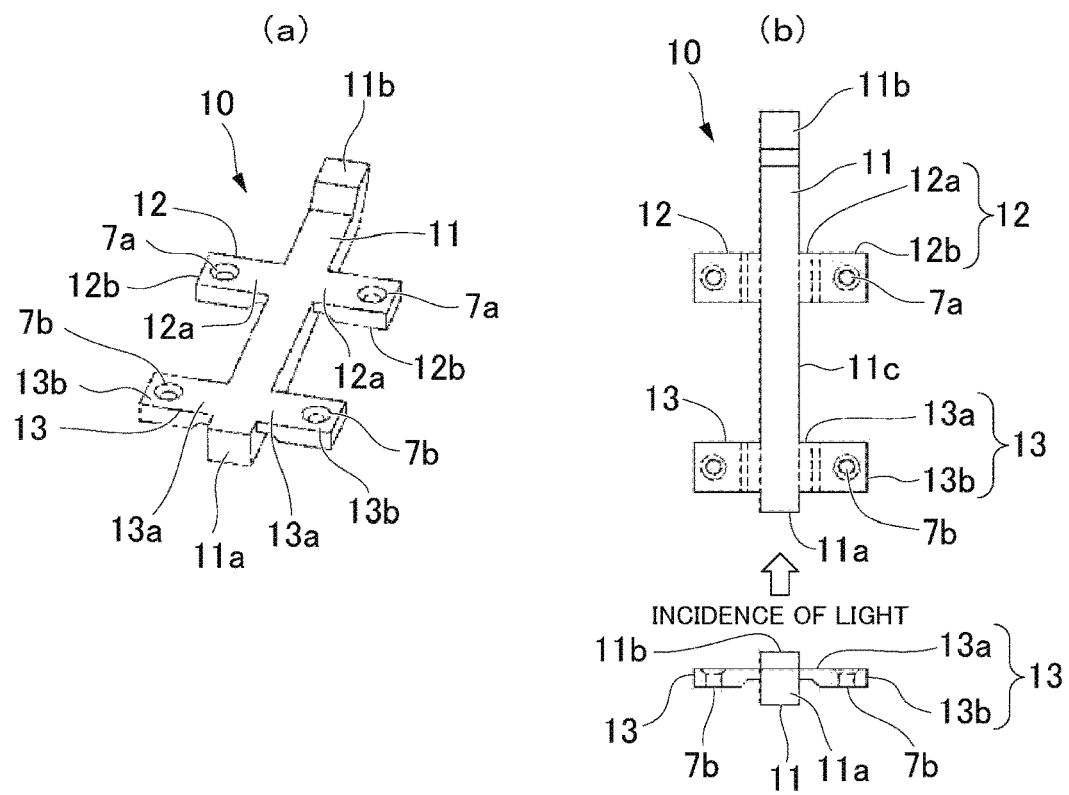
FIG. 3 shows a light guide in accordance with a second example embodiment of the present invention, (a) is a perspective view, and (b) is a front view.
Figure 4:
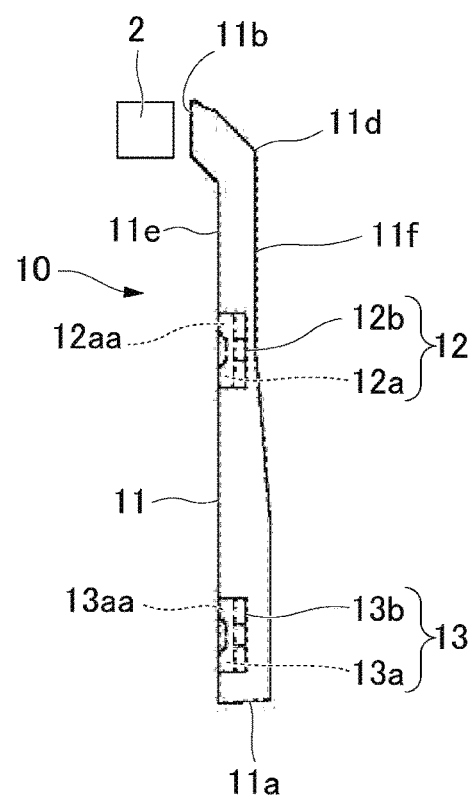
FIG. 4 is a side view showing the light guide and an optical receiving unit.

In a light guide 10 in accordance with the second example embodiment shown in FIGS. 3 (a) and (b) and FIG. 4, a light guide main body 11 is integrally formed with first attachment members 12 and second attachment members 13, which are coupled to the light guide main body 11 and are provided on the both sides of the light guide main body 11 so as to intersect the light guide main body 11. Similarly to the above-described first example embodiment, the light guide main body 11 is formed so that the shape of the light guide main body 11 becomes, for example, approximately a rectangular plate, an incident surface 11a and an exit surface 11b for infrared light are formed in the both end portions in the longitudinal direction of the light guide main body 11, and the both side portions of the light guide main body 11 are side faces 11c. The light guide main body 11 is bent by a predetermined angle in an appropriate direction, such as a thickness direction, at a bent portion 11d near the exit surface 11b, and thus the exit surface 11b is disposed in the direction that is approximately orthogonal to the incident surface 11a. An optical receiving unit 2, which faces the exit surface 11b, is installed at a position near the exit surface 11b.

A surface 11e of the light guide main body 11 is formed so as to be, for example, flush with the surfaces of the first attachment members 12 and the second attachment members 13, and the first attachment members 12 and the second attachment members 13 are formed so that the thicknesses thereof are smaller than the thickness of the light guide main body 11. A back surface 11f of the light guide main body 11 forms a slope so that the thickness in the region from the bent portion 11d to the first attachment members 12 is relatively small and the thickness in the region of the second attachment members 13 is relatively large. For this reason, the shape of the back surface 11f includes an inclined plane in which the thickness between the surface 11e and the back surface 11f increases from the bent portion 11d toward the incident surface 11a.

Preferably, the first attachment members 12 and the second attachment members 13 are formed in, for example, the direction that is approximately orthogonal to the light guide main body 11 and they are disposed approximately in parallel with each other. Similarly to the above-described attachment members 4 of the first example embodiment, the first attachment members 12 and the second attachment members 13 are connected to the side faces 11c of the light guide main body 11. The first attachment members 12 and the second attachment members 13 are formed by connection portions 12a and 13a, of which cross-sectional area in the thickness direction is relatively small, and attachment portions 12b and 13b, of which cross-sectional area in the thickness direction is relatively large. For this reason, similarly to the first example embodiment, the area of each of connection surfaces 12aa and 13aa between the connection portion 12a and 13a and the side faces 11c of the light guide main body 11 is smaller than the cross-sectional area of each of the attachment portions 12b and 13b. Hole portions 7a and 7b are formed in the attachment portions 12b and 13b, respectively, so that the hole portions 7a and 7b penetrate the attachment portions 12b and 13b.

In the light guide 10 in accordance with the present second example embodiment, two pairs of attachment members including the first attachment members 12 and the second attachment members 13 are formed, and thus the strength when the light guide 10 is attached to another member is high.

Next, a light guide unit 16, in which the light guide 10 is installed in a holding member 15, will be described with reference to FIG. 5 and FIG. 6.

Figure 5:
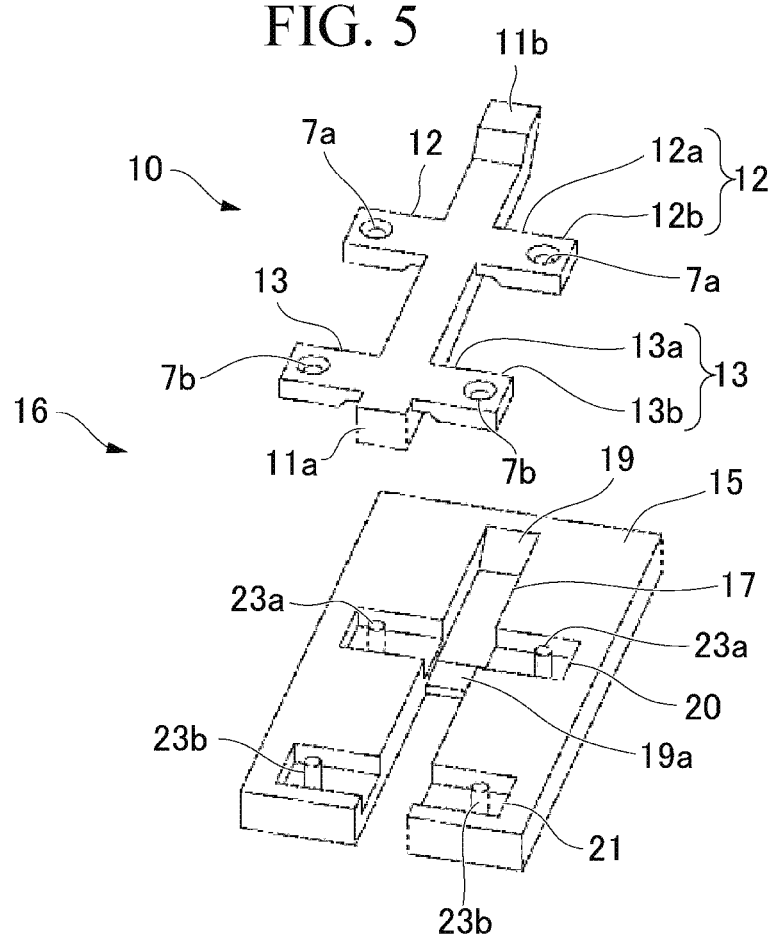
FIG. 5 is an exploded perspective view showing the light guide and a holding member.
Figure 6:
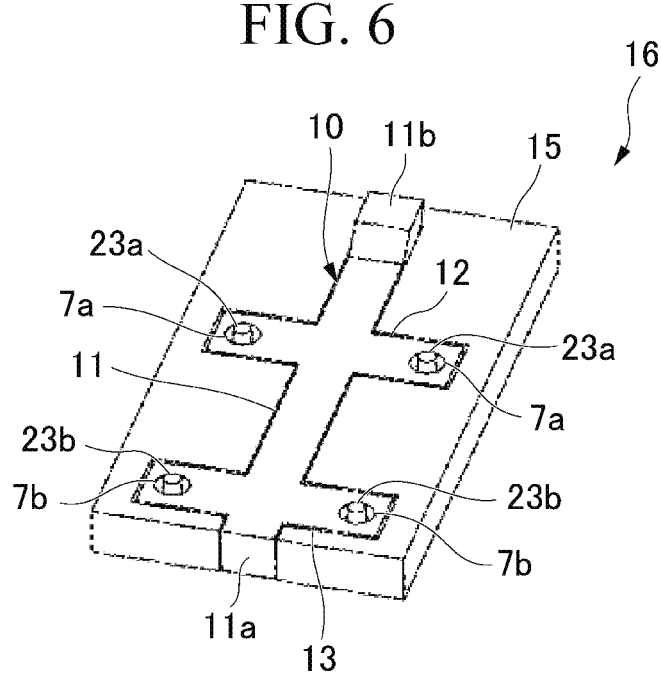
FIG. 6 is a perspective view of a light guide unit, in which the light guide is fitted to the holding member.

In FIG. 5 and FIG. 6, the shape of the holding member 15 is, for example, approximately a flat plate, and a recessed groove 17 to be fitted to the light guide 10 is formed in the front surface of the holding member 15. In the recessed groove 17, a main groove portion 19 is formed at the center of the holding member 15 in the longitudinal direction, and a first attachment groove 20 and a second attachment groove 21 are formed in the direction that is approximately perpendicular to the main groove portion 19 so as to be approximately orthogonal to the main groove portion 19. In the main groove portion 19, the bottom portion is removed along the direction toward the second attachment groove 21, and the main groove portion 19 penetrates to the back surface except that an inclined plane 19a is provided in the region of the first attachment groove 20.

The first attachment groove 20 is a recessed groove portion to which the first attachment members 12 are to be fitted, and first pins 23a that are to be passed through the hole portions 7a are formed so as to protrude at the positions where the first pins 23a face the attachment portions 12b on the both sides. Similarly, the second attachment groove 21 is a recessed groove portion to which the second attachment members 13 are to be fitted, and second pins 23b that are to be passed through the hole portions 7b are formed so as to protrude at the positions where the second pins 23b face the attachment portions 13b on the both sides. Although the first attachment groove 20 and the second attachment groove 21 are formed along their longitudinal directions so as to have the same depth, a difference in level that corresponds to the difference between the thickness of the connection portions 12a and 13a of the first attachment members 12 and the second attachment members 13 and the thickness of the attachment portions 12b and 13b may be provided.

The light guide unit 16 is formed by the light guide 10 and the holding member 15, which is provided with the recessed groove 17, to which the light guide 10 is to be fitted.

Next, a manufacturing method of the light guide unit 16 will be described with reference to FIG. 5 and FIG. 6.

In FIG. 5, the light guide 10 is fitted to the recessed groove 17 of the holding member 15. Then, the first pins 23a on the both sides in the first attachment groove 20 and the second pins 23b on the both sides in the second attachment groove 21 are caused to penetrate the hole portions 7a of the first attachment members 12 and the hole portions 7b of the second attachment members 13, respectively. As a result, as shown in FIG. 6, the exit surface 11b protrudes from the holding member 15 through the bent portion 11d.

Next, the first pins 23a and the second pins 23b are melted and are integrated with the hole portions 7a and the hole portions 7b, respectively, by thermally welding the protruding first pins 23a and the protruding second pins 23b within the hole portions 7a of the first attachment members 12 and the hole portions 7b of the second attachment members 13. The light guide unit 16 can be manufactured in this manner. In the light guide unit 16, the incident surface 11a, which is opposite to the exit surface 11b and faces the optical receiving unit 2, is exposed to the outside through an end face of the holding member 15.

Next, an example in which the light guide unit 16 is installed in a display apparatus 27, which is an example of the electronic device, will be described with reference to FIG. 7 to FIG. 9.

Figure 7:
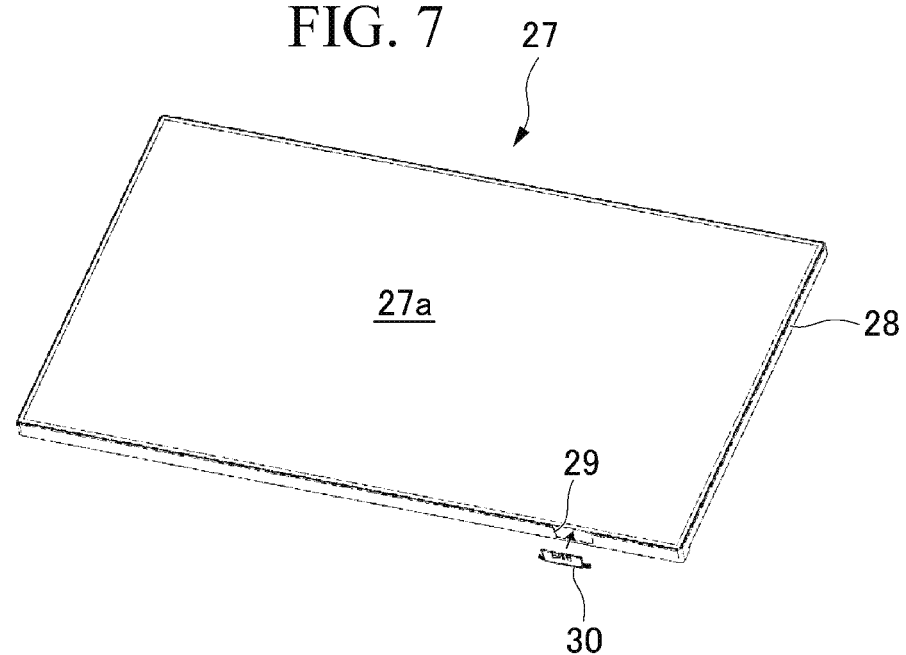
FIG. 7 is an exploded perspective view of a display apparatus and a light guide holding unit.

A bezel 28 is disposed on the four circumference portions of a display surface 27a of the display apparatus 27 shown in FIG. 7, and these constitute the main body of the electronic device. As a fitting portion, for example, an installation recess portion 29 is formed in, for example, the bottom of the lower end portion of the bezel 28, and a light guide holding unit 30, to which the light guide unit 16 is fixed, is installed in the installation recess portion 29. The light guide holding unit 30 has the structure shown in FIG. 8.

In the light guide holding unit 30, part of the shape of the holding member 15, which holds the light guide 10, is different from the above-described shape. Uneven portions are formed on the both end portions of the holding member 15, these uneven portions are fitted to uneven portions that are provided in second holding portions 31 described below, and the hole portions and the pins are thermally welded.

Figure 8:
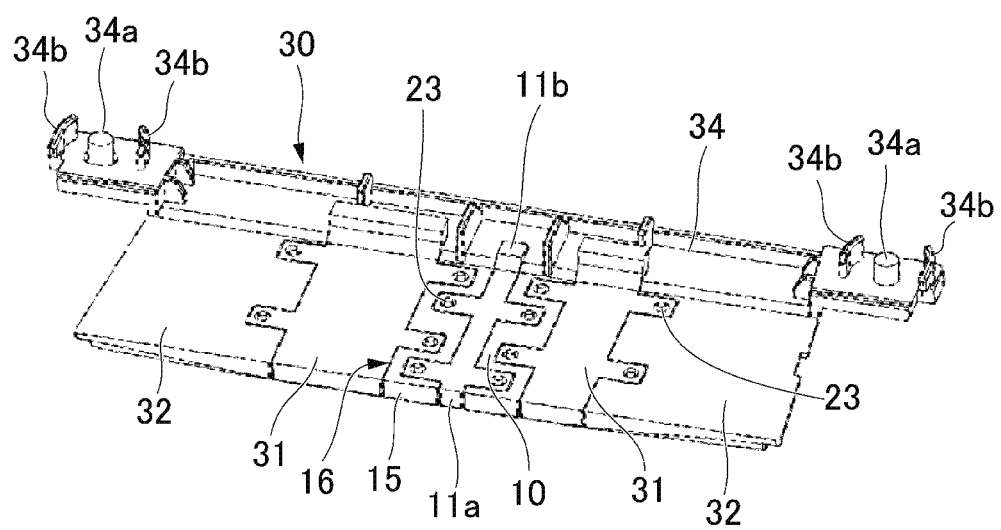
FIG. 8 is a perspective view of the light guide holding unit shown in FIG. 7.

In the light guide holding unit 30 in accordance with the present example embodiment, as shown in FIG. 8, the uneven portions of the second holding members 31 are fitted to the both sides of the holding member 15, which holds the light guide 10 used for remote control using infrared rays, and the second holding members 31 are attached to third holding members 32, which are provided outside the second holding members 31, so as to fit to uneven portions of the third holding members 32. The fitting of the holding member 15 to the second holding members 31 and the fixing of the second holding members 31 to the third holding members 32 are achieved by, for example, inserting the pins 23 of one of the two members into the hole portions 7 of the other of the two members and thermally welding the pins 23 to couple the two members as described above. An engagement member 34 is provided on end portions of the holding members 15, 31, and 32, and engagement pins 34a that are to engage with the installation recess portion 29 of the bezel 28 and fitting pieces 34b that are provided on the both sides of the engagement pins 34a are formed on the both end portions of the engagement member 34 along the longitudinal direction of the engagement member 34.

In the assembled light guide holding unit 30, the incident surface 11a of the light guide 10 is exposed to the outside through an end face that is opposite to the engagement member 34, and the exit surface 11b, which faces the optical receiving unit 2, protrudes from the engagement member 34.

Then, the engagement member 34 of the light guide holding unit 30 is pushed in the installation recess portion 29, which is formed on the bottom of the lower portion of the bezel 28 of the display apparatus 27, to fit the engagement member 34 to the installation recess portion 29, and the light guide holding unit 30 is fitted to the bezel 28 through the engagement pins 34a and the fitting pieces 34b of the engagement member 34.

Figure 9:
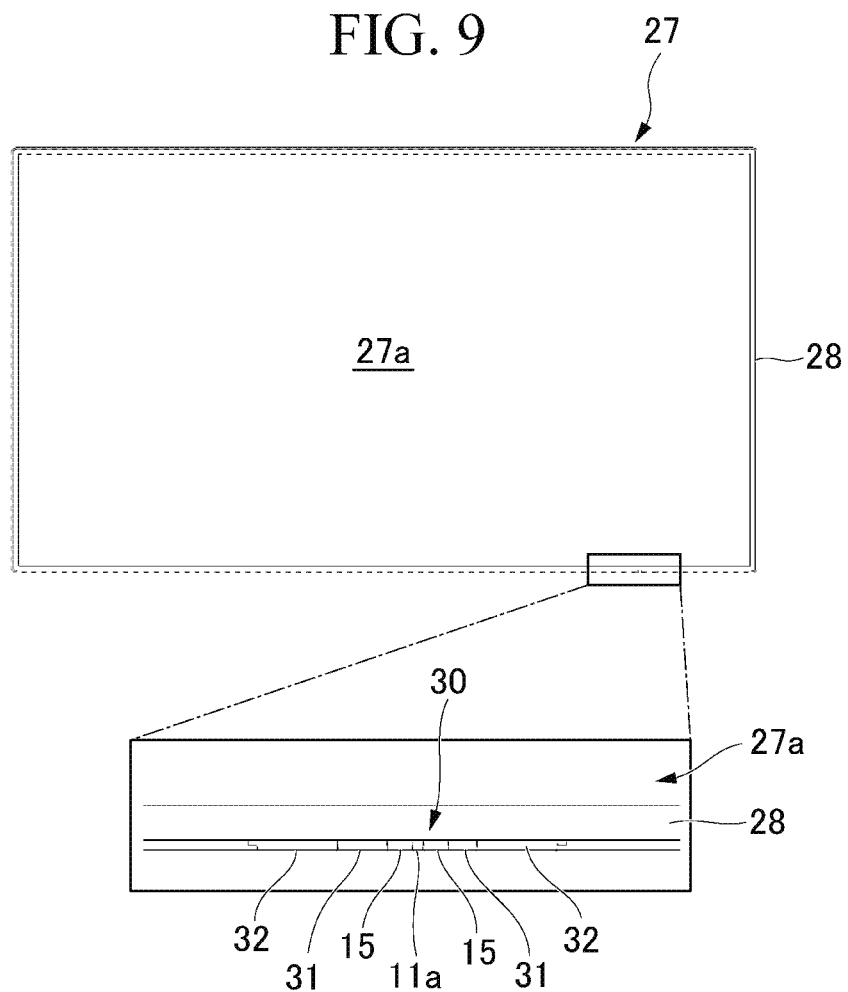
FIG. 9 is a front view of the display apparatus and a partial enlarged view of a bezel.
Figure 10:
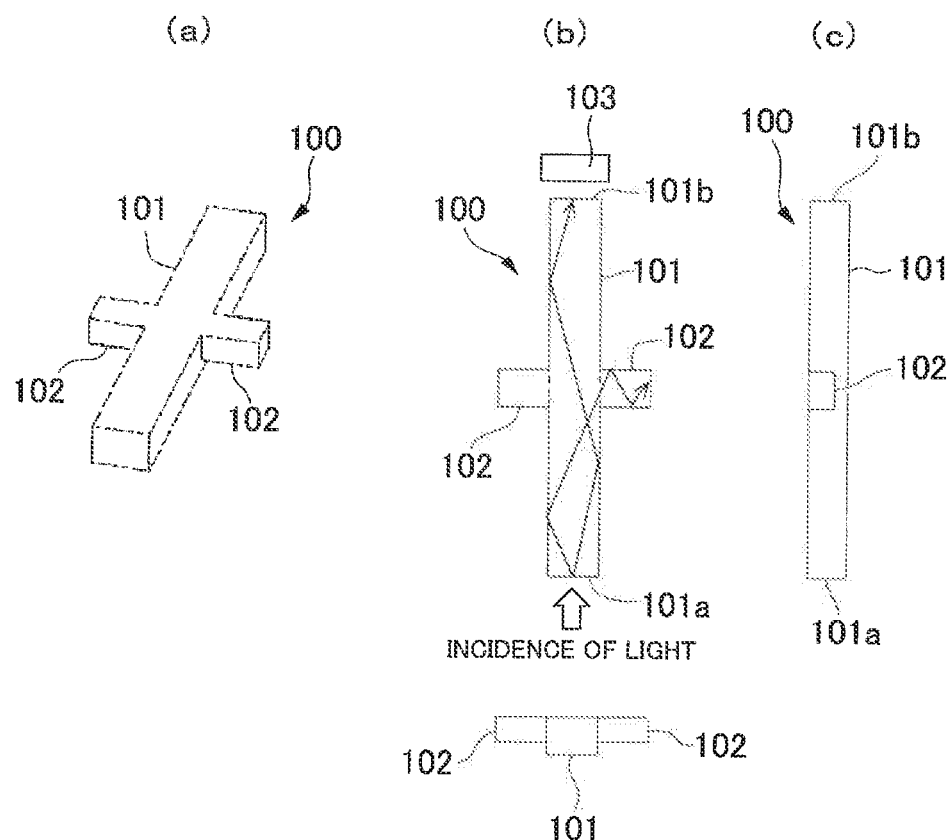
FIG. 10 shows a conventional light guide, (a) is a perspective view, (b) is a front view, and (c) is a side view.

FIG. 9 shows the display apparatus 27, in which the light guide holding unit 30 is installed. In the display apparatus 27, an end portion of the light guide holding unit 30 in the thickness direction that is opposite to the engagement member 34 is exposed from the lower portion of the bezel 28, and the incident surface 11a of the light guide 10, which optically receives infrared light, is located at the center of the end portion.

For this reason, by radiating the infrared light from a remote controller, which is not shown in the drawings, the infrared light is input to the light guide main body 11 through the incident surface 11a, emitted from the exit surface 11b, and received by the optical receiving unit 2, and the display apparatus 27 can be remotely operated.

In the above-described example embodiments, one pair of attachment members 4 or two pairs of attachment members including the first attachment members 12 and the second attachment members 13, which fix the light guide main bodies 3 and 11 in the light guides 1 and 10, are used, but the number of the attachment portions can be appropriately selected depending on the sizes of the light guides 1 and 10 and/or the required fixing strength. Moreover, the attachment members 4, the first attachment members 12, and the second attachment members 13 are not necessarily provided on the both sides of the light guide main bodies 3 and 11, and they may be provided on one side thereof.

It is to be noted that the numbers of the attachment members 4, 12, and 13, which fix the light guide main bodies 3 and 11, are preferably small because if the numbers of the attachment members 4, 12, and 13 are increased, the lost quantity of the infrared light that deviates from the optical path and is introduced to the attachment members 4, 12, or 13 is increased and thus the quantity of the light that arrives at the exit surface 3b or 11b is decreased.

Moreover, in the light guide 1 of the first example embodiment, the light guide main body 3 and the attachment members 4 are formed by means of integral molding, but they may be formed separately. For example, the side faces 3c of the light guide main body 3 may be connected to the connection surfaces 4aa of the attachment members 4 using an adhesive. Alternatively, the attachment members 4 may be fixed by means of pressure welding so that the connection surfaces 4aa of the attachment members 4 contact the both side faces 3c of the light guide main body 3. A similar structure can also be employed in the light guide 10 in accordance with the second example embodiment.

Even in these cases, the light guide main bodies 3 and 11, the attachment members 4, the first attachment members 12, and the second attachment members 13 are preferably made of the same transparent material having the same refractive index. When adhesives are used, it is preferable to use adhesives made of the same transparent material, such as a polycarbonate resin, or adhesives made of transparent materials having close refractive indices.

It is to be noted that the light guides 1 and 10 are not necessarily installed in the holding member 15, and they may be directly fixed to another member, such as an electronic device. In this case, it is assumed that the incident surfaces 3a and 11a of the light guides 1 and 10 are exposed to the outside of another member, such as an electronic device. Moreover, the light radiated to the light guide main bodies 3 and 11 of the light guides 1 and 10 is not limited to infrared rays, and other appropriate kinds of light may be radiated.

Moreover, in the above-described example embodiments, protrusions such as the pins 23, the first pins 23a, and the second pins 23b, which penetrate the hole portions 7, 7a, and 7b, are used as fixing members that fix the light guides 1 and 10 to the holding member 15 or another member, such as an electronic device, and they are thermally welded, but they may be fixed using fixing members, such as screws or an adhesive, instead.

Moreover, electronic devices in which the light guides 1 and 10 of the present invention are installed are not limited to the display apparatus 27, and the present invention can be applied to appropriate devices, such as various kinds of AV devices, household devices such as air conditioners, and imaging apparatuses.

INDUSTRIAL APPLICABILITY

The present invention provides a light guide that includes an attachment portion that can reduce loss of incident light, efficiently carry the light to an exit surface, and enter the light into an optical receiving unit, a light guide unit that is provided with the light guide, an electronic device that is provided with the light guide or the light guide unit, and a manufacturing method of the light guide unit.

DESCRIPTION OF REFERENCE SIGNS

1, 10 light guide
2 optical receiving unit
3, 11 light guide main body
3a, 11a incident surface
3b, 11b exit surface
4 attachment member
4a, 12a, 13a connection portion
4aa, 12aa, 13aa connection surface
4b, 12b, 13b attachment portion
7, 7a, 7b hole portion
12 first attachment member
13 second attachment member
15 holding member
16 light guide unit
17 recessed groove
23a first pin
23b second pin
27 display apparatus
29 installation recess portion
30 light guide holding unit

The invention claimed is:

1. A light guide comprising:
    a light guide main body that guides light input from an incident surface to an exit surface; and
    an attachment member that is connected to the light guide main body and comprises an attachment portion that is to be fixed to another member,
    wherein an area of a connection surface between the attachment member and the light guide main body is smaller than a cross-sectional area of the attachment portion,
    wherein the light further comprises:
    a plurality of attachment members that are connected to the light guide main body, and
    wherein a cross-sectional area of each of a plurality of connection portions in a thickness direction is the same as or greater than an area of each of a plurality of connection surfaces.

2. The light guide according to claim 1, wherein a thickness of the attachment member on a side in which the attachment member is connected to the light guide main body is smaller than a thickness of the attachment portion.

3. The light guide according to claim 1, wherein the light guide main body and the attachment member are integrally formed.

4. A light guide unit comprising:
    the light guide according to claim 1;
    a holding member in which a recessed groove to which the light guide is fitted is formed;
    a protrusion that is formed in one of the attachment portion and the recessed groove; and
    a hole portion that is formed in an other of the attachment portion and the recessed groove, the protrusion being inserted into the hole portion,
    wherein the protrusion is coupled to the hole portion.

5. An electronic device comprising:
    a main body of the electronic device; and
    the light guide according to claim 1, that is installed in the main body of the electronic device,
    wherein the incident surface of the light guide main body is exposed to outside from the main body of the electronic device.

6. A manufacturing method of a light guide unit, the manufacturing method comprising:
    fitting the light guide according to claim 1 to a recessed groove that is formed in a holding member and inserting a protrusion that is formed in one of the attachment portion of the light guide and the recessed groove into a hole portion that is formed in an other of the attachment portion of the light guide and the recessed groove; and
    fixing the protrusion and the hole portion using thermal welding.

7. The light guide according to claim 1, wherein the area of a connection surface of the light guide main body on an area in which the attachment member is connected to the light guide main body is less than the cross-sectional area of the attachment portion.

8. The light guide according to claim 1, wherein the light guide main body includes:
   at least one side face;
   a surface; and
   a back surface,
   wherein the plurality of attachment members are connected to at least one side face of the light guide main body.

9. The light guide according to claim 1, wherein the attachment member is formed in a direction that is orthogonal to the light guide main body.

10. The light guide according to claim 8, wherein the back surface includes an inclined plane, and wherein a thickness between the surface of the light guide main body and the back surface increases from the exit surface to the incident surface.

11. The light guide according to claim 1, wherein the plurality of attachment members are formed in a direction that is orthogonal to the light guide main body.

12. The light guide according to claim 1, wherein the plurality of attachment members are disposed in parallel with each other.

13. The light guide according to claim 8, wherein the plurality of attachment members include a surface, and
   wherein the surface of the light guide main body is flush with a surface of the plurality of attachment members.

14. The light guide according to claim 1, wherein the light guide main body is integrally formed with the plurality of attachment members,
   wherein the plurality of attachment members are provided on at least one side face of the light guide main body, and
   wherein the plurality of attachment members intersect the light guide main body.

15. The light guide unit according to claim 4, wherein the recessed groove includes:
   a first attachment groove; and
   a second attachment groove,
   wherein in the recessed groove, a main groove portion is formed at a center of the holding member in a longitudinal direction, and
   wherein the first attachment groove and the second attachment groove are formed in a direction perpendicular to the main groove portion.

16. The light guide according to claim 10, wherein the exit surface is disposed in a direction that is orthogonal to the incident surface.

17. The light guide according to claim 1, wherein the attachment member is connected to the light guide main body in a position that is between the incident surface and the exit surface.

18. The light guide according to claim 1, wherein a thickness of the attachment portion is greater than a thickness of the connection surface.

* * * * *